United States Patent
Diekmann

[11] Patent Number: 5,607,893
[45] Date of Patent: Mar. 4, 1997

[54] METHOD FOR UNIFORM LOADING OF CATALYST TUBES

[75] Inventor: Ebbe J. Diekmann, Ballerup, Denmark

[73] Assignee: Haldor Topsøe A/S, Denmark

[21] Appl. No.: 349,181

[22] Filed: Dec. 2, 1994

[30] Foreign Application Priority Data

Dec. 2, 1993 [DK] Denmark .................. 1344/93

[51] Int. Cl.⁶ ........................................ B01J 8/08
[52] U.S. Cl. .................. 502/439; 422/213; 422/216; 422/219; 502/523
[58] Field of Search .................. 502/523; 422/213, 422/216, 219

[56] References Cited

U.S. PATENT DOCUMENTS 2,655,273 10/1953 Snow ........................ 414/301
4,701,101 10/1987 Sapoff ........................ 414/786
5,296,202 3/1994 Souers et al. ............... 422/219

FOREIGN PATENT DOCUMENTS 3601366 7/1987 Germany.

*Primary Examiner*—Glenn A. Caldarola
*Assistant Examiner*—In Suk Bullock
*Attorney, Agent, or Firm*—Ostrolenk, Faber, Gerb & Soffen, LLP

[57] ABSTRACT

A method for the uniform loading of catalyst tubes with catalyst particles, which tubes are mounted at tube inlet side in a tube sheet, the method comprises introducing a feedstream of catalyst particles on the tubesheet in a number of substreams with a substantial equal particle flow and velocity by dividing the feedstream and each resulting substream into at least two streams in two or more dividing steps.

6 Claims, 1 Drawing Sheet

METHOD FOR UNIFORM LOADING OF CATALYST TUBES

BACKGROUND OF THE INVENTION

The present invention is directed to the loading of catalyst particles. In particular, the invention provides a method and an apparatus for the uniform loading of catalyst particles in a reactor having a plurality of catalyst tubes.

In conventional procedures for the catalyst loading of the above type of tubular reactors, the catalyst particles are poured in large amounts on the top tube sheet in the reactors, and the particles are allowed to flow into the catalyst tubes. By this method, the loading time of the tubes is very short, and the loading density of catalyst particles are low.

Further a drawback of the conventional loading procedures is a non-uniform distribution of catalyst particles in different tubes of the reactor. By simply pouring large amounts of catalyst particles on the tube sheet, local bridging or plugging of the tube inlet leads to large variations in loading weight and density of the tubes. As a result, variations in pressure drop and flow of process gas through the reactor caused by different loading density and weight is detrimental for the overall efficiency of the catalytic process.

SUMMARY OF THE INVENTION

It has been observed that conveyance of catalyst particles to the inlet of a plurality of tubes under controlled conditions of particle flow and loading time provides a more uniform loading profile of catalyst tubes.

Based on the above observation, this invention provides a method for the uniform loading of catalyst tubes with catalyst particles, which tubes are mounted at tube inlet side in a tube sheet, the method comprises introducing a feedstream of catalyst particles on the tubesheet in a number of substreams with a substantial equal particle flow and velocity by dividing the feedstream and each resulting substream into at least two streams in two or more dividing steps.

The number of dividing steps controls, thereby, the rate of particle conveyance to the tubesheet and into catalyst tubes. By proper adjustment of the number and size of substreams, it is possible to obtain an appropriate loading time and density leading to a substantial uniform density and weight of catalyst particles in the catalyst tubes.

The actual adjustment of the above parameters will, however, further depend on desired process parameters including necessary space velocity and acceptable pressure drop of a process gas being reacted in the catalyst tubes.

The invention, furthermore, provides an apparatus being useful in carrying out the above improved loading method. In its broadest embodiment, the apparatus comprises a stack of horizontal plates being spaced from each other, each plate is provided with a number of apertures of equal size and at a distance and pitch, so that a vertical projection of the apertures to adjacent plates is not concentric with the apertures on the plates and the number of apertures in a succeeding plate is increased by at least one aperture, whereby an incoming stream of catalyst particles is divided into an increasing number of substreams by passage through the apertures.

BRIEF DESCRIPTION OF THE DRAWING

The inventive method and apparatus will be described more detailed with reference to the drawing in which.

DESCRIPTION OF THE INVENTION

Figure 1:
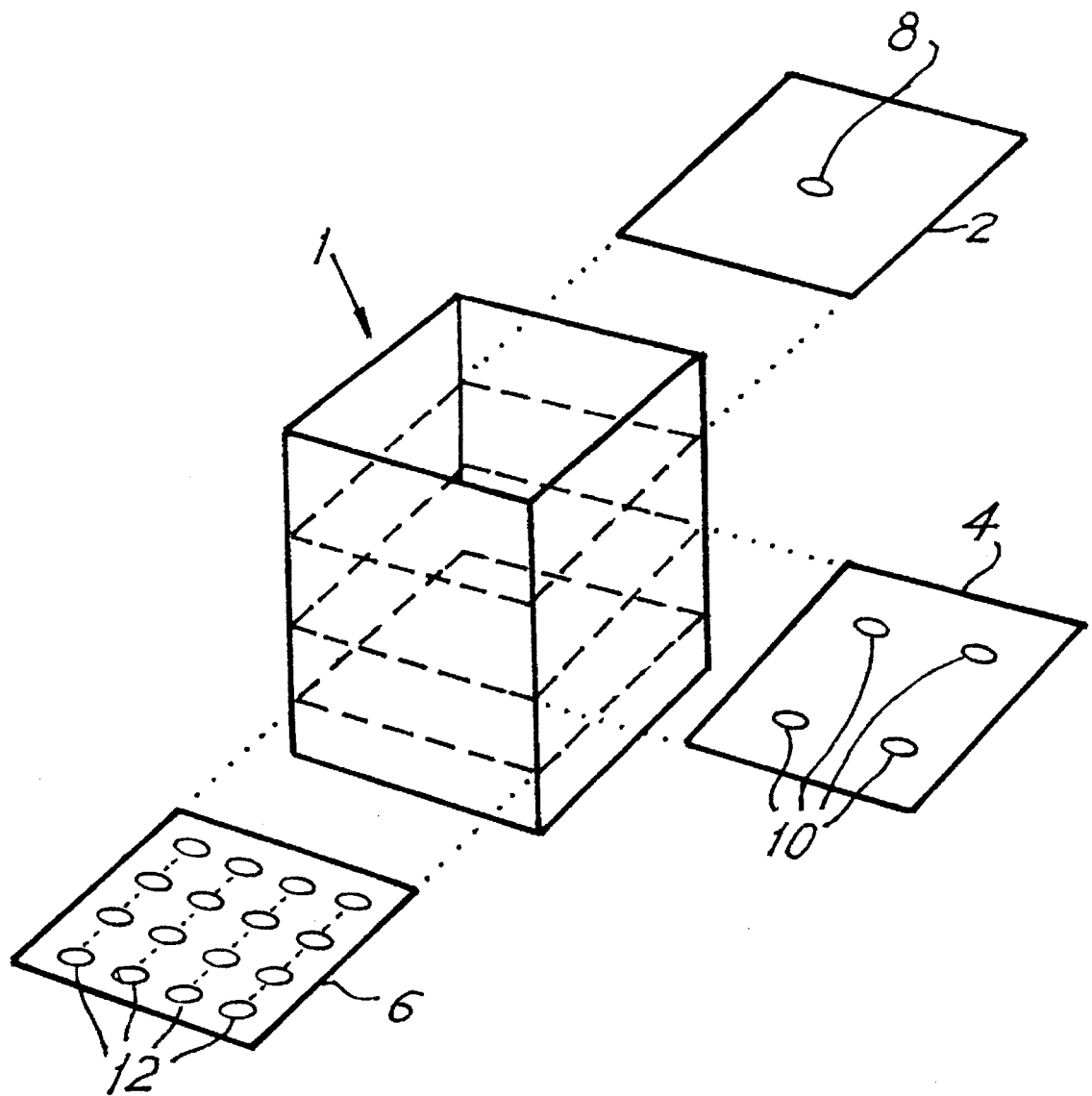
FIG. 1 is a schematic illustration of a specific embodiment of the invention.

A loading apparatus in form of a box 1 holds horizontal plates 2, 4 and 6. The plates are provided with circular apertures 8, 10 and 12. The number of apertures is increased by a factor of 4 from plate 2 to 6. The apertures in the plates are situated, so that a vertical projection of aperture 8 lies on the interaction of the diagonals drawn between apertures 10 on plate 4. Similarly, projections of apertures 10 on plate 4 are each surrounded by 4 apertures 12.

When employing the above apparatus in the loading of a reactor provided with a plurality of catalyst tubes mounted in a tubesheet, a number of the apparatus constructed like box 1 are aligned on the tubesheet. A feed stream of catalyst particles delivered through e.g. a particle pump is poured on plate 2 in box 1. The particles flow freely through aperture 8, which size like the size of the other apertures is adapted to the size and form of the catalyst particles being distributed. At a proper size no bridging or plugging of apertures with particles will occur. The particles flow freely through aperture 8 in plate 2 to plate 4. The stream of catalyst particles hits plate 4 between apertures 10 and the particles flow in an equal amount through apertures 10 as 4 substreams to subsequent plate 6.

On plate 6 each substream from plate 4 is divided to four adjacent apertures 12 on plate 6 in similar manner as on plate 4. Thereby, the feed stream has been divided into 16 substreams, when the particles having passed through bottom plate 6. After passing through apertures 12 in plate 6, the substreams of catalyst particles distribute in an substantially equal amount to the catalyst tubes being covered by box 1.

The amount of distributed catalyst particles to the tubes per unit of time is, thereby, determined by size and number of apertures and the number of catalyst tubes or the size of surface area of the tube sheet covered by the apparatus.

I claim:

1. A method for the uniform loading of catalyst tubes with catalyst particles, which tubes are mounted at the tube inlet side of a tube sheet, comprising the steps of:
   dividing a feed stream of catalyst particles into at least two first substreams,
   dividing each first substream into at least two second substreams, and
   introducing at least two streams of catalyst particles after the formation of said second substreams at an equal particle flow and velocity onto the tube sheet for the uniform loading of the catalyst tubes.

2. The method of claim 1 in which each of the second substreams is divided into at least two third substreams prior to introduction of the streams of catalyst particles onto the tube sheet.

3. The method of claim 2 in which each division results in the formation of more than two substreams.

4. The method of claim 3 in which each division results in the formation of four substreams.

5. The method of claim 1 in which each division results in the formation of four substreams.

6. The method of claim 1 in which each division results in the formation of more than two substreams.

* * * * *